United States Patent [19]

Fujita et al.

[11] Patent Number: 4,715,007

[45] Date of Patent: Dec. 22, 1987

[54] INSTRUMENT FOR MEASURING FILM THICKNESS

[75] Inventors: Toshio Fujita, Yokohama; Kouzi Hasegawa, Kamifukuoka, both of Japan

[73] Assignee: Kett Electric Laboratory, Tokyo, Japan

[21] Appl. No.: 698,471

[22] Filed: Feb. 5, 1985

[30] Foreign Application Priority Data

Jul. 31, 1984 [JP] Japan .................................. 59-159294

[51] Int. Cl.$^4$ .................................................. G01B 7/10
[52] U.S. Cl. .................................... 364/563; 324/230; 73/150 R
[58] Field of Search ................ 364/563; 324/58.5 R, 324/230; 73/150 R

[56] References Cited

U.S. PATENT DOCUMENTS

| | | | |
|---|---|---|---|
| 2,862,178 | 11/1958 | Moore | 324/230 X |
| 3,450,985 | 6/1969 | Lorenzi et al. | 324/230 |
| 3,922,599 | 11/1975 | Steingroever | 324/230 |
| 3,986,105 | 10/1976 | Nix et al. | 364/563 X |
| 4,005,359 | 1/1977 | Smort | 324/230 |
| 4,079,237 | 3/1978 | Schesinger | 364/563 |
| 4,495,558 | 1/1985 | Cath et al. | 364/563 |
| 4,510,577 | 4/1985 | Tsujii et al. | 364/563 |
| 4,513,384 | 4/1985 | Rosencwaig | 364/563 |
| 4,553,095 | 11/1985 | Schenk, Jr. et al. | 324/230 |
| 4,555,767 | 11/1985 | Case et al. | 364/563 |
| 4,593,244 | 6/1986 | Summers et al. | 324/230 |
| 4,618,825 | 10/1986 | Fischer | 324/230 |

FOREIGN PATENT DOCUMENTS

WO83/01505  4/1983  PCT Int'l Appl. .................. 324/230

Primary Examiner—Errol A. Krass
Assistant Examiner—Joseph L. Dixon
Attorney, Agent, or Firm—Pollock, Vande Sane & Priddy

[57] ABSTRACT

An instrument for measuring a thickness of a surface processing film on a metal includes a plurality of instruction executing keys, an enclosed recording apparatus, a terminal for connecting a probe to detect an electrical signal corresponding to the film thickness when the probe is pressed onto the metal, a circuit for converting the electrical signal obtained from the probe to a digital value indicative of the film thickness, and a circuit for arithmetically processing the digital value in accordance with instructions by the instruction executing keys. The results of the processing are outputted to the recording apparatus.

3 Claims, 7 Drawing Figures

INSTRUMENT FOR MEASURING FILM THICKNESS

FIELD OF THE INVENTION

The present invention relates to a film thickness measuring intrument and, more particularly, to an instrument for measuring a thickness of a surface processing film which was coated on a metal plate.

BACKGROUND OF THE INVENTION

Generally, a thickness of a painted film, plated film or aluminate film which is coated on a metal for purposes of anti-corrosion, insulation or good outside appearance lies within a wide range of values, from a few micrometers to hundreds of micrometers. To measure this thickness without hurting the film, there is an eddy-current instrument which uses a high frequency electromagnetic field affected by what is called an eddy current loss. This eddy current loss is caused in a metal due to the applied high frequency electromagnetic field that is generated from the primary winding wound around a core of a probe which was pressed on the film. It is measured by the secondary winding wound around that probe. The high frequency electromagnetic field is then converted into the film thickness and is displayed. On the other hand, when the metal is an iron based system having a high permeability, the electromagnetic inductive coupling between the probe and the metal becomes strong, so that it is advantageous to constitute a measuring circuit. Such a measuring instrument is known as an electromagnetic instrument for measuring thickness. The invention can be commonly applied to both instruments for measuring thickness of the above-mentioned types.

As the request for quality of the surface processing film on the metal becomes severe, there is demanded an instrument which can more promptly perform the measurement of film thickness at various locations and can obtain a higher arithmetic operation result.

At a construction field such as a bridge, steel tower, high-rise building, etc., when a film thickness is measured using a conventional thickness measuring instrument, in order to see if the thickness lies within a reference range the displayed value regarding the thickness is read out by a measuring person who climbs the measuring location and is recorded by another recording person. This process is repeatedly executed with respect to each measuring point. The data recorded is inputted to a computing apparatus or the like, so that the mean value is obtained, or a discrimination is made to see if it lies within the reference range of thickness. It is very dangerous for the measuring person himself to record the measured data and carry out the arithmetic operation to obtain the mean value at the above-mentioned construction field.

SUMMARY OF THE INVENTION

It is therefore an object of the present invention to provide an instrument for measuring film thickness, the instrument being able to record the data to be measured in a printer built therein and can present a simple measuring operation at a dangerous location.

Another object of the invention is to provide film thickness measuring instrument which can completely perform the continuous measurement and recording by a sole person at a measuring location.

The present invention will be apparent from the following detailed description taken in conjunction with the accompanying drawings, in which:

DETAILED DESCRIPTION OF THE INVENTION

Figure 1:
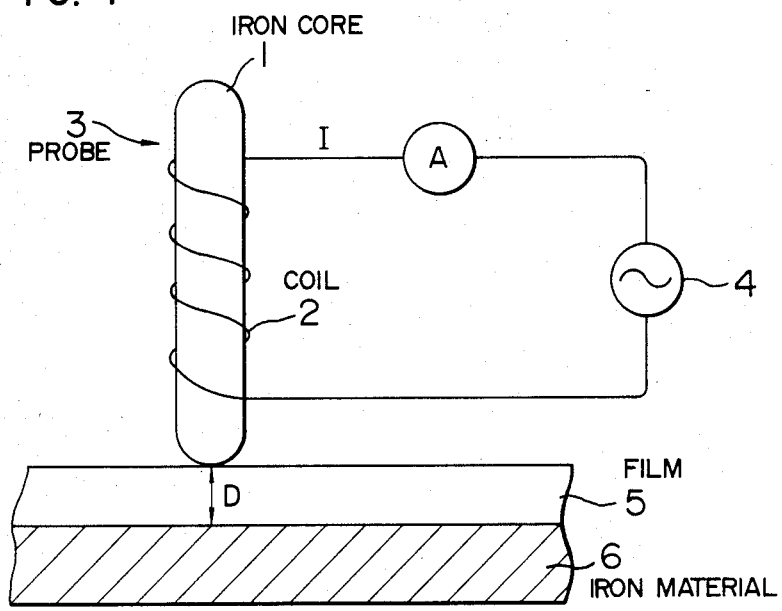
Figure 2:
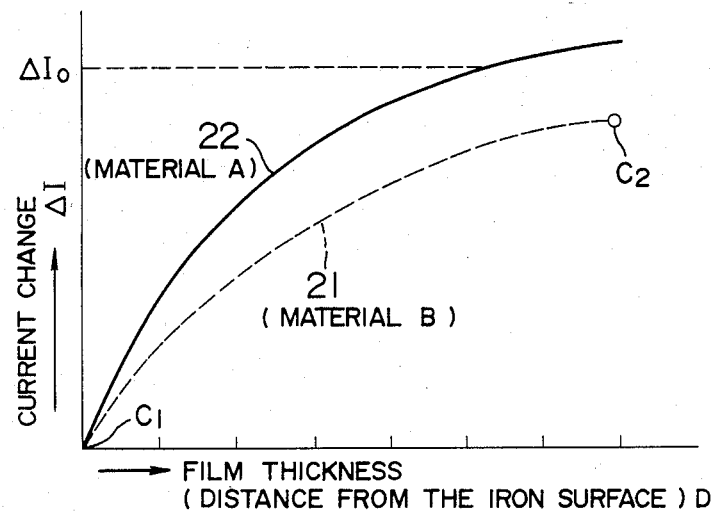
Figure 3:
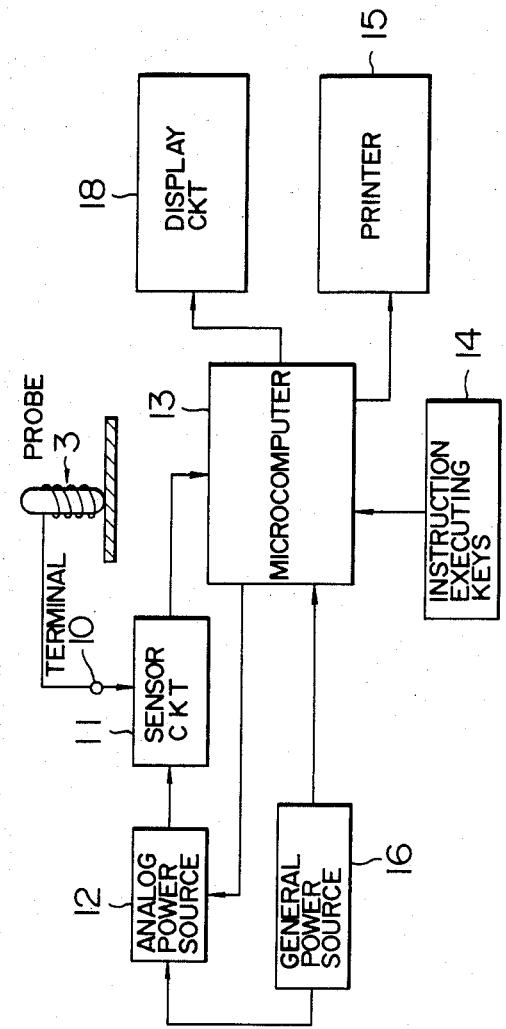
Figure 4:
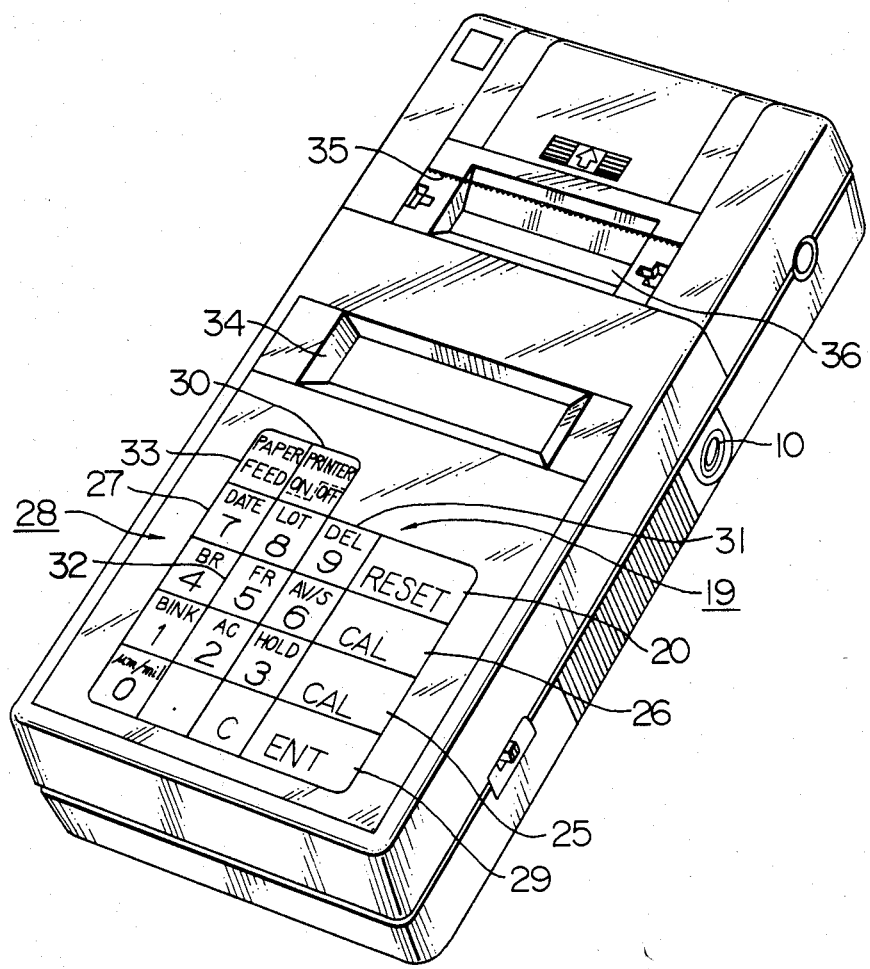
Figure 5:
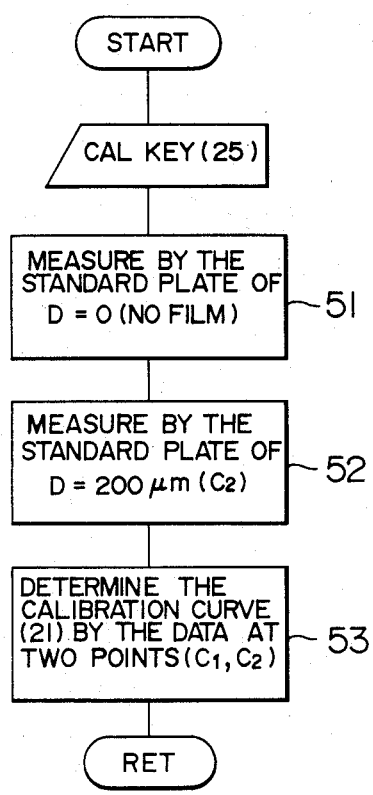
Figure 6:
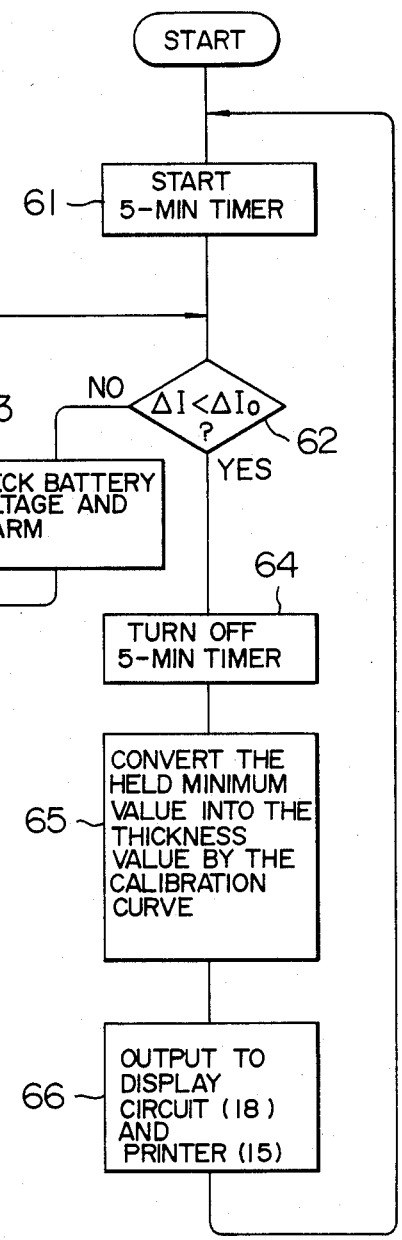
Figure 7:
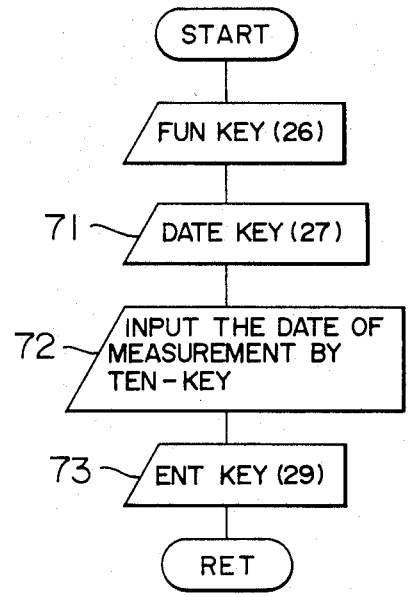

FIG. 1 illustrates a principle diagram;
FIG. 2 shows a current change diagram;
FIG. 3 is a block circuit diagram;
FIG. 4 illustrates an external view; and
FIGS. 5 to 7 show flow charts for explaining the operation.

FIG. 1 is a diagram for explaining a principle of the measurement, in which a current I is flowing from an AC power source 4 through a probe 3 which is constituted by an iron core 1 around which a coil 2 is wound.

As the probe 3 approaches an iron material 6 whose surface is coated by a film 5, this current changes as shown in FIG. 2. If a calibration curve of the current change is prepared using a standard plate which has the same material as the iron material 6 and on which a film having a predetermined thickness has been preliminarily coated on the basis of the well-known electromagnetic induction rule, a film thickness D can be found by obtaining the current change which is actually measured.

FIG. 3 shows a diagram of a block circuit to realize the foregoing measurement. A sensor circuit 11 includes the AC power source 4, a circuit to detect the current change $\Delta I$ and A/D converter for converting the detected current change to the digital value. This digital value is inputted to a microcomputer 13 having a well-knwon RAM and ROM and is converted to the thickness value of the film 5 on the basis of the data on the calibration curve stored in the ROM. This thickness value is sent to a display circuit 18 and displayed, or it is sent to a printer 15 and printed. Although a general power source 16 supplies a power source current to these circuit elements, an analog power source 12 is connected to supply a voltage having a less fluctuation to the sensor circuit 11. A detailed constitution of instruction executing keys 14 is written in a key arrangement 19 in an external view shown in FIG. 4.

FIG. 5 shows a flow chart for explaining the operation to determine the calibration curve using two standard plates prior to the actual measurement. When a CAL key in FIG. 4 is pressed, an interruption signal is inputted to the microcomputer 13, so that the operation of a program shown in this flow chart is started. The probe is pressed onto the standard plate which is not subjected to the film process, that is, the plate having a film thickness of D=0. The minimum value corresponding to point $C_1$ (FIG. 2) after the current change $\Delta I$ shown in FIG. 2 became a value below a certain threshold value $\Delta I_0$ is held in the sensor circuit 11 and stored in an RAM (not shown). (51 in FIG. 5) Next, the data corresponding to point $C_2$ is similarly stored by use of the standard plate having a film thickness of D=200 $\mu$m. (52 in FIG. 5) A parameter of the quadratic equation indicative of the calibration curve shown in FIG. 2 is determined on the basis of data at those two points and a preparation to calculate the measurement film thickness corresponding to the current change $\Delta I$ after that is completed. (53 in FIG. 5)

FIG. 6 shows a main program which is started when a power switch of the film thickness measuring instrument of the invention, i.e., a RESET key 20 is turned on. This main program is stored in an ROM in the microcomputer 13. In the case where a measurement is not performed for five minutes or longer after the turn-on of the power switch, a timer in the microcomputer 13 is set to five minutes in block 61 in order to automatically disconnect the analog power source 12 for saving energy. Block 63 indicates the voltage drop checking or alarming operation of a battery, i.e., the general power source 16 that is executed in such a standby mode.

The process routine skips the above-mentioned loop when the probe 3 is used for measurement, namely, when the current change $\Delta I$ becomes smaller than the threshold value $\Delta I_0$ and advances from discriminating block 62 to block 64, thereby canceling the time counting operation of the five-minute timer. In other words, it is assumed in this measuring instrument that the single measuring operation is carried out in a sufficiently shorter time than five minutes. The measured value is expressed by a predetermined unit of $\mu$m or mil (block 65) and is outputted to the display circuit 18 or printer 15 (block 66). The display content is indicated in a display 34 which is located at the central portion of the external view in FIG. 4.

After that, the foregoing procedure is repeated and the measurement is continued.

According to the film thickness inspection specifications at many measuring fields, the measurement is executed by predetermined times at every measuring points. Therefore, it is possible to preliminarily designate by the key arrangement 19 in a manner such that the number of measurement times is preset and when it reaches the preset value, the mean value of the measured values, number of measurement times, standard deviation, data, and measurement number are automatically outputted. The procedure to set the date among various designating procedures will be explained with reference to FIG. 7.

When a FUN key 26 is pressed, the operation shown in FIG. 6 is interrupted. A program in FIG. 7 is started by pressing a double defining key 27 to designate a numeral 7 and function (date=DATE) (block 71). The data is inputted by a ten-key 28 (block 72). Depressing an ENT key 29 causes the designating operation to be finished (block 73).

Due to the above designating operations, there is no need at all for the measuring person to input any key after the measuring operation started. Namely, the operation of the program shown in FIG. 6 is started by merely pressing the probe onto a measuring point and the measurement result is automatically outputted; therefore, it is enough for the measuring person to merely observe the output value. Other terms different from the above-mentioned terms can be further added or eliminated as the measurement output terms of the thickness measuring instrument according to the invention.

On one hand, although the timer has been set at five minutes, the designer may freely set the timer to a different time.

Although FIG. 2 shows a curve 22 regarding material A and a curve 21 with respect to material B, the number of kinds of different materials is not limited. In addition, trouble with regard to the measuring operation is eliminated by providing the power source for the operation of the printer 15 separate from the battery of the general power source 16.

A PRINTER ON/OFF key 30 is used when the printer output is unnecessary.

A DEL key 31 is used to erase the value which was erroneously measured.

An F.R. key 32 is used when a mean value $A_n$, $$A_n = \frac{1}{n} \sum_{j=1}^{n} X_j \tag{1}$$

of the measurement values which were measured so far and a standard deviation s, $$s = \sqrt{\frac{1}{n-1}\left\{\sum_{j=1}^{n} X_j^2 - \frac{1}{n}\left(\sum_{j=1}^{n} X_j\right)^2\right\}} \tag{2}$$

are outputted irrespective of a predetermined number of times.

The thickness measuring instrument of the invention is equipped with the small-sized printer 15 therein and has a shape as shown in the external view of FIG. 4, so that it can be easily put in a pocket. The probe 3 can be pulled out from a terminal 10 and another kind of probe may be used.

When a PAPER FEED key 33 is pressed, a print paper is fed out from a concave portion 36 and the printed portion of the print paper can be cut out using a saw blade 35.

What is claimed is:

1. An electromagnetic instrument having a main body for measuring a thickness of a surface processing film on a metal, said instrument comprising:
    (a) a plurality of instruction executing keys provided on a front surface of said main body;
    (b) a recording apparatus and an indicator enclosed in said main body;
    (c) a terminal located on said main body for connecting a probe wound by a coil, the probe generating an electromagnetic field in said metal and detecting an electrical signal corresponding to said film thickness in accordance with a distance to said metal when said probe is pressed onto said film coated on said metal;
    (d) a converting circuit for converting said electrical signal obtained from said probe to a digital value indicative of said film thickness; and
    (e) an operating circuit for performing processing on said digital value in accordance with instructions inputted from said instruction executing keys;
    wherein the results of said processing are outputted to said recording apparatus in response to pressing operations of said probe for a predetermined number of measurement times, the predetermined number of measurement times being preliminarily inputted from said instruction executing keys.

2. An instrument according to claim 1, further comprising an analog power source for supplying power to said converting circuit for only a predetermined time after the depression of the instruction executing keys.

3. An electromagnetic measuring instrument having a main body for measuring a thickness of a surface processing film on a metal, said instrument comprising:
    (a) a plurality of instruction executing keys provided on a front surface of said main body;
    (b) a recording apparatus and an indicator enclosed in said main body;
    (c) a terminal located on said main body for connecting a probe wound by a coil, said probe generating an electromagnetic field in said metal and detecting an electrical signal corresponding to said film thickness in accordance with a distance to said metal when said probe is pressed onto said film coated on the metal;

(d) a converting circuit for converting said electrical signal obtained from said probe to a digital value indicative of the film thickness;

(e) an operating circuit for performing processing on said digital value in accordance with instructions inputted from said instruction executing keys, and (f) a holding circuit for holding the digital value, the digital value corresponding to the minimum value of the distances between the probe and the metal; wherein an average of said film thicknesses and its standard deviation are calculated and, together with a number of measurements of the film thickness, outputted to said recording apparatus and to said indicator in response to pressing operations of said probe for a predetermined number of measurement times, said predetermined number of measurement times being preliminarily inputted from said instruction executing keys.

* * * * *